Oct. 23, 1962  A. KASATKIN  3,059,704
ROTARY CULTIVATOR
Filed Oct. 21, 1960  2 Sheets-Sheet 1

INVENTOR
ANATOL KASATKIN

BY Alexander Riaboff
ATTORNEY

INVENTOR.
ANATOL KASATKIN
BY Alexander Riaboff
ATTORNEY

16 United States Patent Office 3,059,704
Patented Oct. 23, 1962

3,059,704
ROTARY CULTIVATOR
Anatol Kasatkin, 3921 Balboa St., San Francisco, Calif.
Filed Oct. 21, 1960, Ser. No. 64,139
2 Claims. (Cl. 172—38)

This invention relates to a rotary cultivator.

The object of this invention is to provide a rotary cultivator for cultivating ground around trees, posts, or the like.

Another object of my invention is to provide a rotary cultivibrator consisting of a plurality of planetary drills, operated through a central main gear, said planetary drills being free to rotate with said main gear or around their own axes.

Another object of my invention is to provide a rotary cultivator carried and operated by a tractor, which cultivator includes a plurality of peripheral planetary earth boring tools operable through a central main gear and a plurality of plantary gears, which normally are permitted to rotate with said main gear, and which rotation is stopped by contact with a tree, or a post, whereupon the planetary gears with the earth boring tools begin to rotate about their own axes thus cultivating the ground around said tree, or post.

Another object of this invention is to provide a connection between the tractor and the cultivator carried thereby which permits the cultivator to be raised or lowered and to swing to and away from said tractor.

Other objects and advantages will appear as the specification proceeds and the novel features of the device will be particularly pointed out in the claims hereto annexed.

My invention is illustrated in the accompanying drawings in which.

Figure 1:
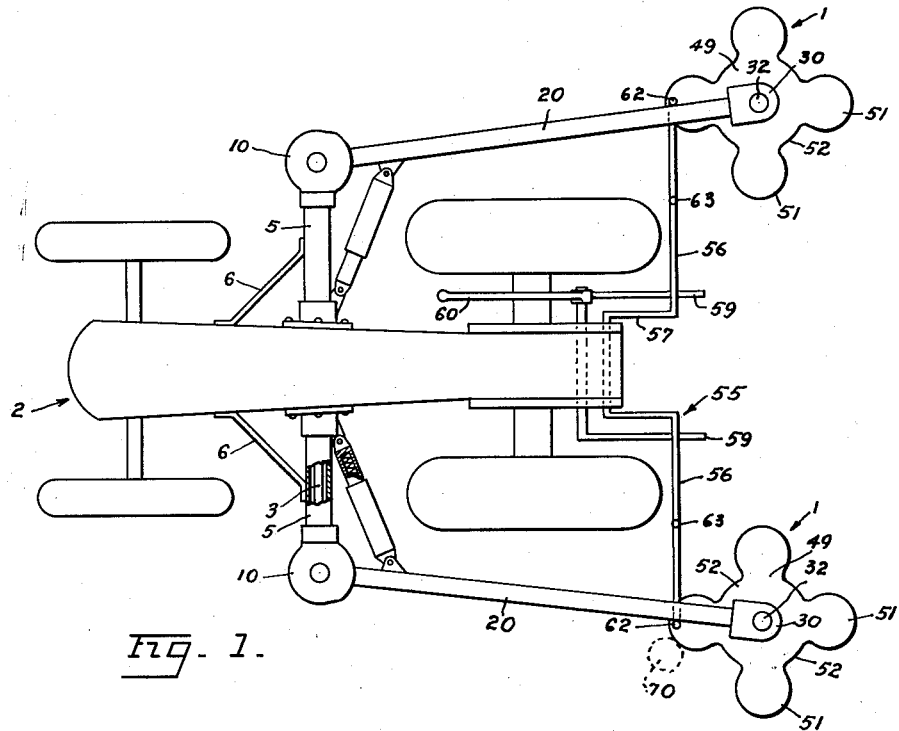
FIG. 1 is a plan view of a tractor and two rotary cultivators carried thereby.

In detail, preferably two cultivators 1 are carried by a tractor 2 and are operated thereby through a mechanism presently described.

The tractor 2 is provided with a side power drive shaft 3 enclosed in a housing 5, extending at a right angle to said tractor. The housing 5 is preferably reinforced by a brace 6. A special transmission 10 is secured to the free end of the housing 5 with a freedom of rotatinng thereabout through a certain arc, said transmission comprising a housing 11, containing a bevel gear 12 carried by the end of the side shaft 3 and meshing with a second bevel gear 13 rotatably carried by said housing 11. The bevel gear 13 is also in mesh with a third bevel gear 14 secured to one end of a cultivator drive shaft 17.

The cultivator drive shaft 17 is arranged in relation to said transmission with a freedom of oscillating in a horizontal plane toward and away from the tractor in a following manner: the cultivator drive shaft 17 is enclosed in a sleeve 20 one end of which carries a yoke 21 which is pivoted about a vertical stub shaft 22 passing therethrough and the bevel gear 14, and anchored in the top and the bottom of the transmission housing 11. The sleeve 20 passes through an elongated opening 25 in the side wall 26 of said transmission housing, thus permitting the sleeve 20 with the cultivator drive shaft 17 to swing about said stub shaft through a certain arc.

The other end of the sleeve 20 carries the cultivator 1 by means of a yoke 30 and a main shaft 31 passing therethrough. The latter is formed with a head 32 by means of which said shaft 31 is suspended in the latter yoke. The shaft 31 carries secured thereto within the yoke 30 a horizontal bevel gear 35 which meshes with a bevel gear 36 carried by the cultivator drive shaft 17. In this manner the rotation of the side drive shaft 3 is transmitted to the cultivator main shaft 31.

The shaft 31 extends downwardly from the yoke 30 and passes through the main bearing 37 located thereunder. The lower end of said shaft 31 carries secured thereto a main cultivator gear 38.

The main bearing 37 is of considerable size and rigidly and equidistantly supports a plurality of peripheral vertical bearings 40 by means of bars 41 radiating from said main bearing. Each of the bearings 40 carries an auxiliary shaft 42 therein. The latter is suspended by a head 43 resting on said bearing 40, and carries a planetary gear 44 secured thereto under said bearing and meshing with the main gear 38.

Each auxiliary shaft 42 terminates with a threaded shank 45, extending downwardly below said planetary gear 44, and carries thereon, removably secured thereto, an earth boring tool, such as an auger 46. The latter is provided with a guard 47, in form of a flat disk located above said auger proper to prevent dirt from getting into the cultivator mechanism.

The main bearing 37, peripheral bearings 40, and the gears 38 and 44 are enclosed in a casing 49, the side wall 50 of which follows closely the outline of said gears forming cylindrical closures 51 enclosing the planetary gears 44, separated by pockets 52 wherein the casing side wall 50 follows the main gear 38.

Figure 2:
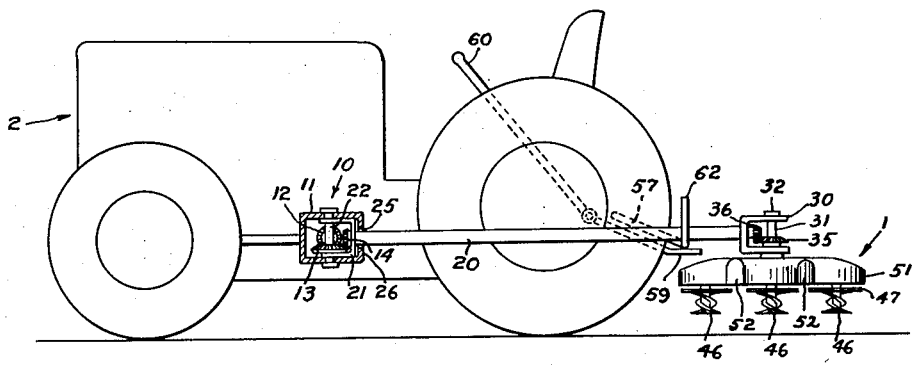
FIG. 2 is a side view of said tractor and cultivators, some parts being shown in section.
Figure 3:
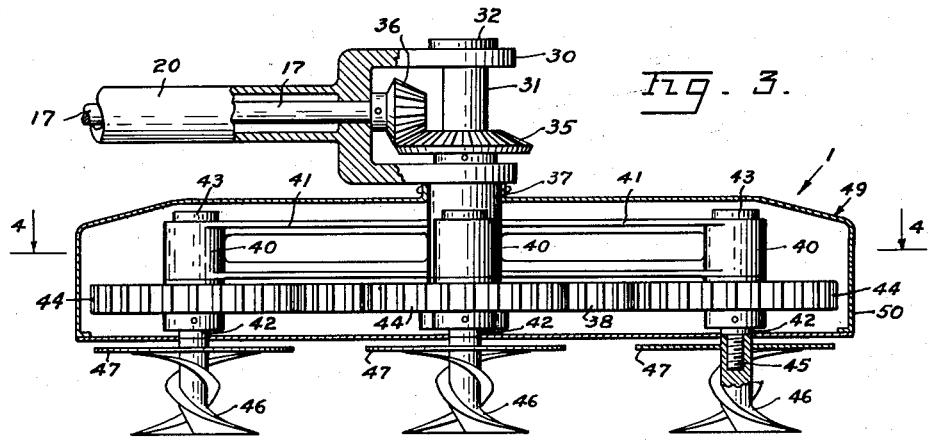
FIG. 3 is a side view of the cultivator, partly shown in section.
Figure 4:
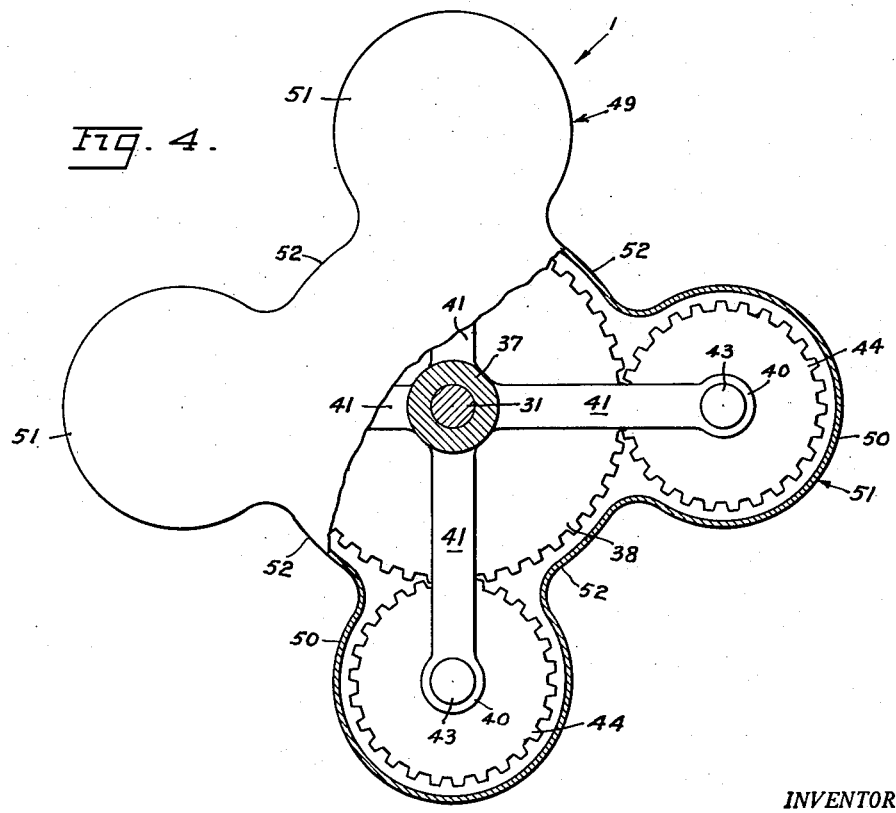
FIG. 4 is a cross-section of said cultivator taken substantially along the line 4—4 of FIG. 3, some parts being shown in elevation.

The cultivator 1 is supported in inoperative position by a lifter 55 comprises a bar 56, the ends of which extend under the sleeves 20 and support the same, and the central off-set portion 57, which is journalled in the tractor 2. The lifter 55 is operated by a lever 59 having a handle 60 operable by the driver of the tractor. Means, not shown in the drawings, are provided to retain the lever 59 in the position shown in FIG. 2 in order to support the cultivators 1 above the ground until the handle is shifted toward the end of the tractor, thus lowering said cultivators on the ground.

The bar 56 carries an outer stop 62 located at each end thereof and an inner stop 63 located some distance inwardly from the outer stop for the purpose of limiting the outward and inward movement of the sleeve 20 on said bar 56. The stops 62 and 63 are of sufficient size to limit the side movements of said sleeve 20 at all times.

Means are also provided to push resiliently the sleeve 20 outwardly, said means being shown as a cylinder 65, one end of which is pivoted to the housing 5 and slidable in a cylinder 66 pivoted to the sleeve 20, both cylinders being pushed apart by a spring 67 located therein.

The device operates as follows: when the tractor 2 approaches a tree 70, or a post, or the like, the driver lowers the cultivator 1, operatively connects the side drive shaft 3 with the tractor motor and maneuvers the tractor in such a manner as to strike said tree 70 with said cultivator as close to the sleeve 20 as possible.

The cultivator 1, normally rotates as a unit with the main shaft 31. The contact with the tree 70 arrests its rotation with said main shaft and thereupon the planetary gears 44 begin to rotate driving the earth boring tools into the ground. The tractor is driven slowly forward, and the cultivator moves forward constantly contacting the tree by the cylindrical closure 51, then by the side wall 50 in the pocket 52 and along the latter, at which time the first closure swings to the other side of the tree. Thereupon, the second cylindrical closure 51 contacts and slides around the tree, and finally the cultivator is pulled away. The movements of the cylindrical closures 51 around the tree, as above described, carry the earth boring tools 46 and cultivate the ground more than 180 degrees around the same.

Having thus described this invention, I claim:

1. The combination of a tractor with a pair of cultivators carried by the sides of the tractor for cultivating ground around a tree, or the like, while the tractor moves in a substantially straight line, comprising a casing, a main vertical bearing therein, a main shaft passing through said bearing with freedom of rotation therein, a main gear secured to the lower end of said main shaft, a plurality of peripheral vertical bearings circumferentially spaced about said main gear in said casing, shafts rotatably arranged in said peripheral bearings, a planetary gear secured to each of said last mentioned shafts, said planetary gears being in mesh with the main gear, an earth cultivating tool operatively connected to each of said last mentioned shafts for rotation therewith, means for operatively connecting each of said main shafts with the tractor for rotating the same, means for connecting said cultivators with the tractor with freedom of horizontal and vertical oscillation, means for urging the cultivators outwardly in relation to said tractor, said casing being of a configuration closely following that of said gears to permit a tree to enter a pocket formed in the side of said casing between a pair of adjoining planetary gears for cultivating ground around said tree in an arc of over 180° while the tractor moves in a straight line.

2. The combination of a tractor with a cultivator for cultivating ground around a tree, or the like, said cultivator comprising a casing, a main gear and a plurality of planetary gears in mesh therewith arranged circumferentially about said main gear for rotation in said casing;

an earth cultivating tool operatively connected to each of said planetary gears for rotation therewith;

a transmission carried by said tractor;

a drive shaft one end of which is operatively connected to said transmission and the other to said main gear for rotating the same and the cultivator;

a sleeve enclosing said drive shaft and connecting said cutivator and said transmission with freedom of horizontal and vertical oscillation;

means mounted on the tractor for yieldably urging the cultivator away from said tractor;

said cultivator being normally rotated about its central, vertical axis passing through the main shaft until the cultivator contacts a tree, or the like, whereupon the rotation of the cultivator stops, the planetary gears begin to rotate in relation to said casing and the cultivator swings around the tree in an arc of about 180° while the tractor moves in a straight line; and means carried by the tractor for lowering said cultivator for cultivating the ground and for lifting the same.

References Cited in the file of this patent
UNITED STATES PATENTS

| | | |
|---|---|---|
| 1,584,962 | Schmutte | May 18, 1926 |
| 2,531,557 | Dayton | Nov. 28, 1950 |
| 2,619,891 | Sloper | Dec. 2, 1952 |
| 2,749,824 | Friday | June 12, 1956 |
| 2,791,081 | Allen et al. | May 7, 1957 |
| 2,826,129 | Olson | Mar. 11, 1958 |

FOREIGN PATENTS

| | | |
|---|---|---|
| 124,089 | Switzerland | Jan. 2, 1938 |